United States Patent
Yasui et al.

(10) Patent No.: US 8,646,958 B2
(45) Date of Patent: Feb. 11, 2014

(54) LIGHT EMITTING DEVICE

(75) Inventors: Nobuyuki Yasui, Chiyoda-ku (JP);
Hiroshi Aruga, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/610,060

(22) Filed: Sep. 11, 2012

(65) Prior Publication Data
US 2013/0242594 A1    Sep. 19, 2013

(30) Foreign Application Priority Data
Mar. 15, 2012    (JP) .................................. 2012-059027

(51) Int. Cl.
*G02B 6/00*    (2006.01)

(52) U.S. Cl.
USPC .......................................... 362/551; 313/512

(58) Field of Classification Search
USPC .......................................... 362/551; 313/512
See application file for complete search history.

(56) References Cited

U.S. PATENT DOCUMENTS

2011/0013869 A1    1/2011    Pezeshki et al.

*Primary Examiner* — Joseph L Williams
(74) *Attorney, Agent, or Firm* — Oblon, Spivak, McClelland, Maier & Neustadt, L.L.P.

(57) ABSTRACT

A light emitting device capable of adjusting height difference between the light emitters and optical waveguides individually and easily with high accuracy is realized. The light emitting device comprises multiple light emitters; an optical multiplexer comprising the openings of multiple optical waveguides at the incidence end for light from the multiple light emitters and the opening of an optical waveguide combining said multiple optical waveguides at the light exit end; and multiple drivers driving said multiple light emitters, respectively, along the tilt direction of a surface tilted at a given angle with respect to the surface on which said optical waveguides are formed, wherein said light emitters are provided at an angle that makes the central axes of light from said light emitters in the light emission direction parallel to the surface on which said optical waveguides are formed.

6 Claims, 8 Drawing Sheets

TOP VIEW

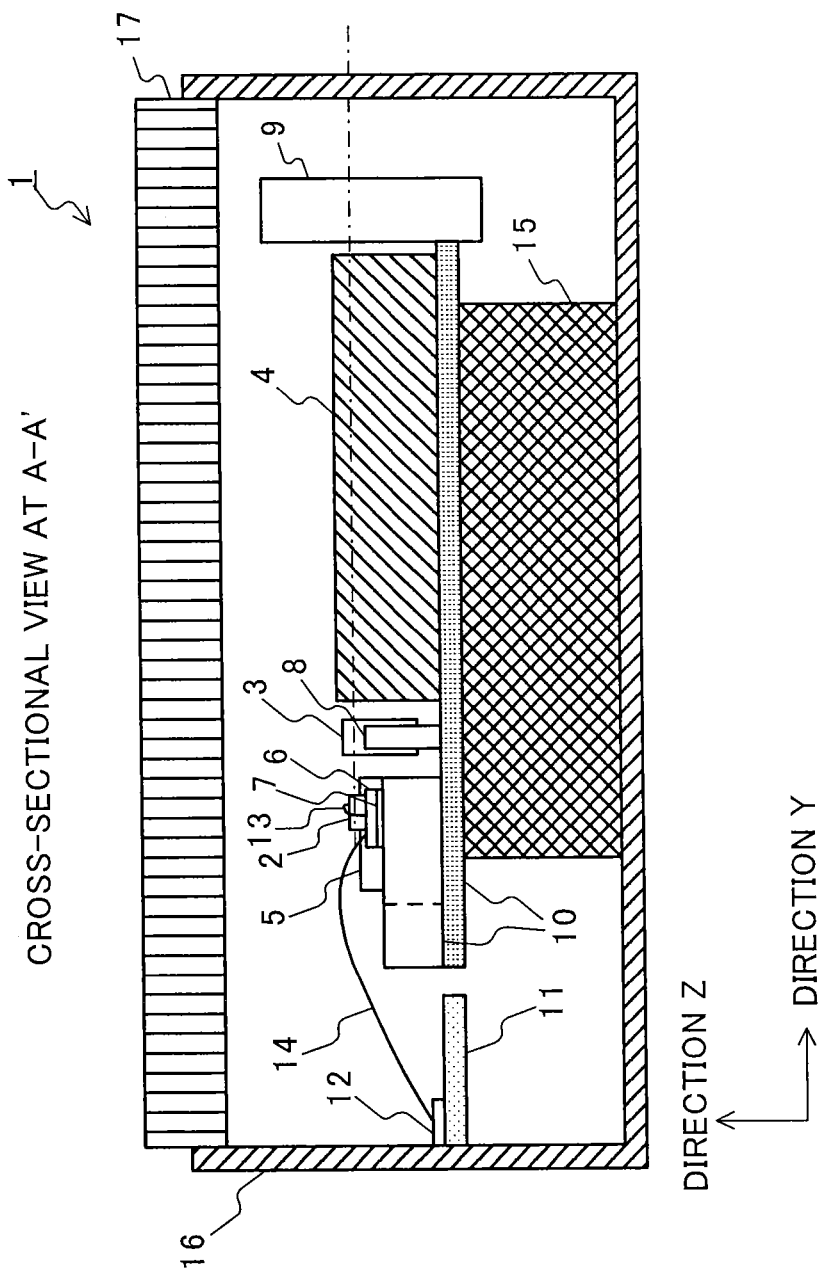

CROSS-SECTIONAL VIEW AT B-B'

DIRECTION Z

DIRECTION X

ENLARGED VIEW OF PART C IN FIG.3A

DIRECTION Z

DIRECTION X

CROSS-SECTIONAL VIEW AT B-B'

DIRECTION Z
DIRECTION X

ENLARGED VIEW OF PART D

DIRECTION Z
DIRECTION X

CROSS-SECTIONAL VIEW AT A-A'

ENLARGED VIEW OF PART E

LIGHT EMITTING DEVICE

CROSS-REFERENCE TO RELATED APPLICATION

This application claims the benefit of Japanese Patent Application No. 2012-59027, filed on Mar. 15, 2012, the entire disclosure of which is incorporated by reference herein.

FIELD

This application relates to a light emitting device comprising light emitting parts and an optical multiplexer.

BACKGROUND

High coupling efficiency is important for a light emitting device comprising a light emitting part and an optical waveguide system such as an optical fiber and optical waveguide and outputting light from the light emitting part via the optical waveguide system. The coupling efficiency is based on the power ratio of the incident light to the optical waveguide system and the guided light. Here, the coupling efficiency is used to mean the ratio in power of the guided light to the light generated in the light emitting part.

In order to improve the coupling efficiency, it is important to minimize the height difference between the luminous point of the light emitting part and the light incidence part of the optical waveguide system. Generally, a lens is provided between the light emitting part and optical waveguide system to collect and guide light emitted from the light emitting part into the light incidence part of the optical waveguide system for further improving the coupling efficiency.

However, when a light emitting part, a lens, and an optical waveguide system are mounted to constitute a light emitting device, generally, there will be difference in height (height difference) between the luminous point of the light emitting part and the center of the light incidence part of the optical waveguide system. The coupling efficiency will be low unless the height is adjusted.

For example, when a light emitting device is composed of an optical semiconductor device as the light emitting part, a lens, and an optical fiber as the optical waveguide system, the optical semiconductor device, lens, and optical fiber are mounted in this order so that the lens and optical fiber can be adjusted in height with respect to the luminous point of the optical semiconductor device, thereby preventing the coupling efficiency from deteriorating due to height difference of the luminous point upon mounting.

On the other hand, in a light emitting device comprising multiple light emitting parts and multiple optical waveguides corresponding in number to the light emitting parts as the optical waveguide system instead of an optical fiber (a light emitting part and an optical waveguide corresponding to the light emitting part are collectively termed a channel), the light emitting parts are subject to variation in mounted height, and the light incidence part of the optical waveguide in each channel should be adjusted in height.

In the above case, the same assemble order as the structure consisting of a light emitting part and an optical fiber as the optical waveguide system can be used to reduce height difference upon mounting between the luminous point of the light emitting part and the corresponding optical waveguide in one channel. However, since the optical multiplexer is already mounted, it is difficult to adjust the height difference upon mounting of the luminous point of the light emitting part using the optical multiplexer so as to match the height of the light incidence part of the optical waveguide corresponding to the light emitting part in the other channels.

Not only variation in height among the luminous points of the light emitting parts but also variation in height among multiple optical waveguides formed in the optical multiplexer should be adjusted. Without such adjustment, the average coupling efficiency between multiple light emitting parts and the optical multiplexer deteriorates.

In order to ameliorate the aforementioned deterioration in coupling efficiency between multiple light emitting parts and an optical multiplexer due to height difference between the luminous point of the light emitting part and the optical waveguide in each channel, an invention is disclosed in which a lens is interposed between an optical semiconductor device as the light emitting part and the optical multiplexer and the position of the lens is three-dimensionally adjusted in each channel to improve the coupling efficiency (Patent Literature 1). For mounting, a lens is mounted on the mechanism part for three-dimensional movement, the lens is moved to the optimum position by the mechanism part, and the mechanism part is fixed by solder melted by a heater.

PRIOR ART LITERATURE

Patent Literature

Patent Literature 1: US Patent Application Publication No. 2011/0013869.

SUMMARY

As described above, the Patent Literature 1 reduces deterioration in the coupling efficiency due to height differences between the luminous points of light emitting parts and the optical waveguides formed in the optical multiplexer through three-dimensional positional adjustment of the lens. However, its effect is not sufficient. Furthermore, it is not easy to adjust height differences between the light emitting parts and optical waveguides individually because of tight required adjustment accuracy (approximately $1/100$ µm).

The present invention is invented in view of the above circumstances and an exemplary object of the present invention is to realize a light emitting device capable of adjusting the height of the light emitting parts to reduce height difference between the light emitting parts and optical waveguides individually and easily with high accuracy.

The light emitting device according to the present invention comprises multiple light emitters; an optical multiplexer comprising openings of multiple optical waveguides at the incidence end for light from the multiple light emitters and an opening of an optical waveguide combining the multiple optical waveguides at the light exit end; and multiple drivers driving the multiple light emitters, respectively, along a tilt direction of a surface tilted at a given angle with respect to the surface on which the optical waveguides are formed, wherein the light emitters are provided at an angle that makes the central axes of light from the light emitters in the light emission direction parallel to the surface on which the optical waveguides are formed.

The above light emitting device according to the present invention can adjust each height of the light emitting parts to reduce height difference between the light emitting parts and optical waveguides individually and easily with high accuracy. Thus, such adjustment enables improvement in the coupling efficiency.

BRIEF DESCRIPTION OF THE DRAWINGS

A more complete understanding of this application can be obtained when the following detailed description is considered in conjunction with the following drawings, in which:

FIG. 2 is a cross-sectional view at A-A' of the light emitting device according to Embodiment 1;

DETAILED DESCRIPTION

Embodiment 1

Figure 1:
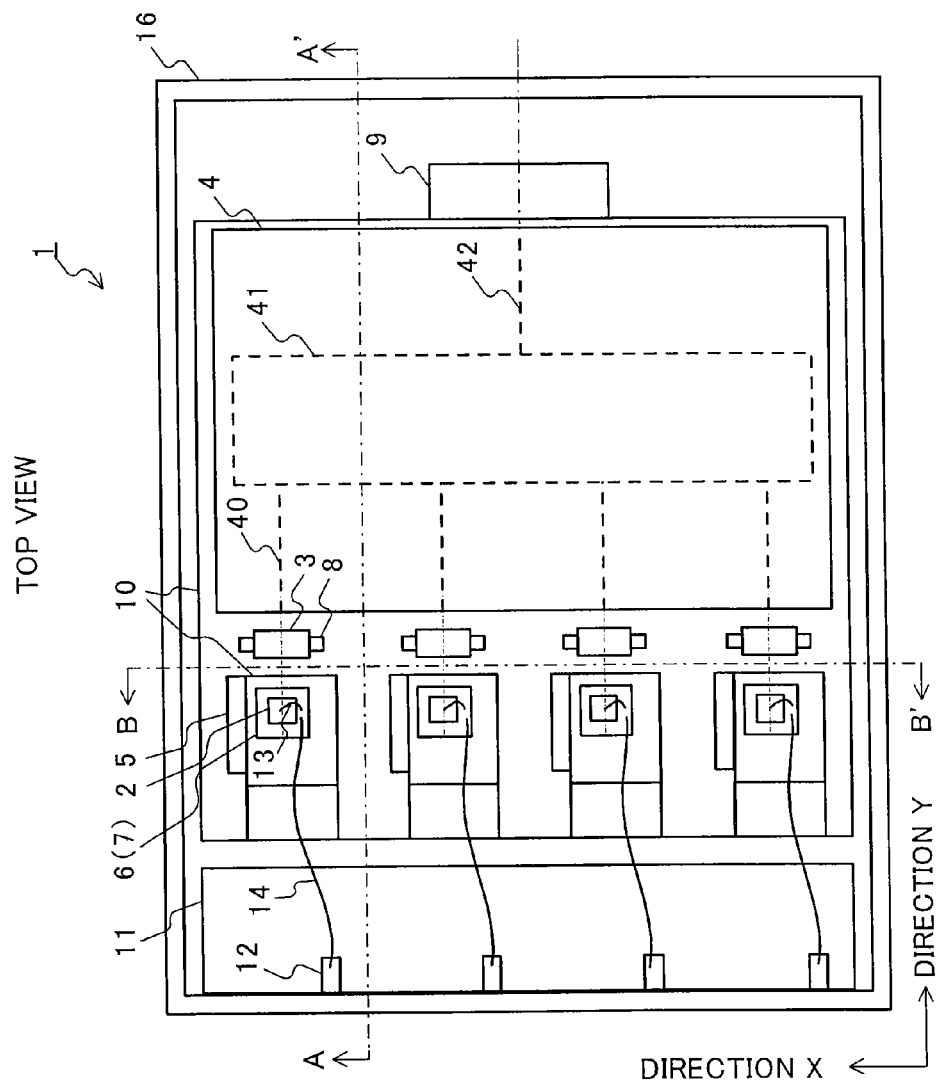
FIG. 1 is a top view of an exemplary configuration of the light emitting device according to Embodiment 1 of the present invention.
Figure 3A:
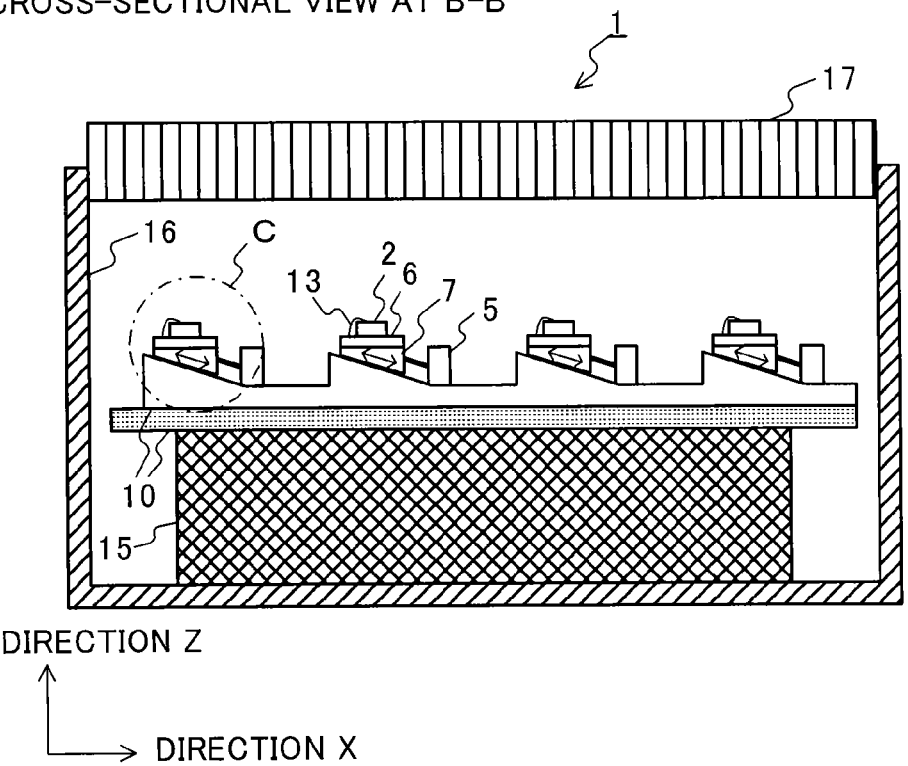
FIG. 3A is a cross-sectional view at B-B' of the light emitting device according to Embodiment 1.
Figure 3B:
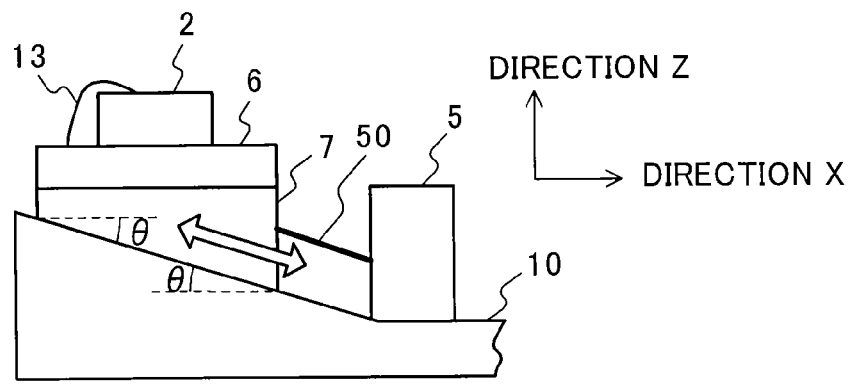
FIG. 3B is an enlarged view of the part C in FIG. 3A.

FIG. 1 is a top view of an exemplary configuration of the light emitting device according to Embodiment 1. FIG. 2 is a cross-sectional view at A-A' in FIG. 1 and FIG. 3A is a cross-sectional view at B-B' in FIG. 1. FIG. 3B shows an enlarged view of the part C enclosed by a dash-dot line in FIG. 3A. In FIGS. 1 to 3B, the directions X, Y, and Z are presented. The directions X, Y and Z will be defined later.

A light emitting device 1 comprises, as components, multiple light emitting parts 2, multiple first lenses 3, an optical multiplexer 4, and multiple drive parts 5, and further comprises multiple light emitting part substrates 6, multiple light emitting part carriers 7, multiple lens holders 8, a second lens 9, a lens carrier 10, a feed-through 11, multiple patterns 12, multiple light emitting part wires 13, multiple signal wires 14, a package carrier 15 (shown only in FIGS. 2 and 3A), a package 16, and a package cover 17 (shown only in FIGS. 2 and 3A). Multiple pieces of a component mentioned above correspond to multiple light emitting parts 2, respectively.

The multiple light emitting parts 2 are each composed of an optical semiconductor device such as a laser diode and emit light for the light emitting device 1. In FIGS. 1 to 3A, four light emitting parts 2 are provided by way of example.

The multiple first lenses 3 correspond to the multiple light emitting parts 2, respectively. A first lens 3 is provided between a light emitting part 2 and the opening of an optical waveguide 40 of the optical multiplexer 4 at an incidence end corresponding to the light emitting part 2 to collect light emitted from the luminous point of the light emitting part 2 into the light incidence end opening of the corresponding optical waveguide 40.

The optical multiplexer 4 comprises multiple optical waveguides 40, an optical waveguide 42, and an optical multiplexing part 41. The optical multiplexer 4 guides and multiplexes light entering the incidence end openings of the multiple optical waveguides 40 to the optical multiplexing part 41 via the optical waveguides 40, and outputs the multiplexed light via the exit end opening of the optical waveguide 42. The incidence end openings of the multiple optical waveguides 40 face the luminous points of the multiple light emitting parts 2 via the first lenses 3, respectively. The longitudinal direction of the optical waveguides 40, namely the optical waveguide direction, is termed the direction Y. The direction in which the multiple optical waveguides 40 of the optical multiplexer 4 are arrayed is termed the direction X (which is also termed the width direction of the optical multiplexer 4). The direction perpendicular to the directions X and Y is termed the direction Z, which is the height direction.

The multiple drive parts 5 correspond to the multiple light emitting parts 2, respectively. The drive parts 5 drive the corresponding light emitting parts 2 to adjust their heights, which will be described in detail later.

The multiple light emitting part substrates 6 each serve as a substrate on which a circuit pattern for using the light emitting part 2 is formed. A light emitting part 2 is provided on each light emitting part substrate 6. The light emitting part 2 and light emitting part substrate 6 are wired for power supply to the light emitting part 2 and transmission/reception of signals. These wires are shown representatively by a light emitting part wire 13. Furthermore, a light emitting part substrate 6 and a pattern 12 on the feed-through 11a are also wired for power supply and transmission/reception of signals. These wires are shown representatively by a signal wire 14.

The multiple light emitting part carriers 7 correspond to the light emitting parts 2, respectively. A light emitting part 2 is provided on the top surface of a light emitting part carrier 7 via a light emitting part substrate 6. The light emitting part carriers 7 are driven by the drive parts 5, respectively. Moving its position, the light emitting part carrier 7 changes its height. Consequently, the position of the light emitting part 2 in the height direction (the direction Z) is adjusted. More specifically, as shown in the part C enclosed by the dash-dot line in FIG. 3A and the enlarged view of the part C in FIG. 3B, the light emitting part carrier 7 has a surface, the one opposite to the surface on which the light emitting part substrate 6 is formed, tilted at an angle θ with respect to the same. The surface is tilted toward the height direction at an elevation angle θ on the basis of the direction (the direction X) perpendicular to the longitudinal direction (the direction Y) of the optical waveguides 40 on the surface (an X-Y plane) on which the optical waveguides 40 are formed.

The multiple lens holders 8 correspond to the multiple first lenses 3, respectively. The lens holders 8 hold the first lenses 3 on the lens carrier 10 in the manner that the positions of the first lenses 3 are three-dimensionally adjustable. The term "three-dimensionally adjustable" means that their positions are adjustable in the directions X, Y, and Z and in rotational directions about the axes X, Y, and Z.

The second lens 9 collects light output from the optical multiplexer 4.

The lens carrier 10 is a base to mount the lens holders 8 and second lens 9 and enable positional adjustment of the first lenses 3 via the lens holders 8. The lens carrier 10 is also a base to mount the light emitting part carriers 7 and optical multiplexer 4. Each of the parts of the lens carrier 10 where the light emitting part carriers 7 are mounted comprises, as shown in the part C enclosed by the dash-dot line in FIG. 3A and the enlarged view of the part C in FIG. 3B, a surface tilted at the same angle as the tilted surface of the light emitting part carrier 7. The light emitting part carrier 7 is driven by the drive part 5 on the tilted surface of the lens carrier 10 along the direction of tilt. Consequently, the height of the light emitting part carrier 7 and thus the height of the luminous point of the light emitting part 2 provided thereon is adjusted.

The feed-through 11 connects inside and outside of the package 16 for power supply and transmission/reception of various signals. More specifically, receiving the signal wires 14 at the patterns 12 formed on the feed-through 11, the feed-through 11 receives power supply from outside the package 16 and transmits/receives signals to/from outside resources via the signal wires 14.

The package carrier 15 is a support base to support the lens carrier 10 and place it at a given position within the package 16 (see FIGS. 2 and 3A).

The package 16 houses the above-described components. The package 16 is sealed by the package cover 17 (see FIGS. 2 and 3A).

Operation of the light emitting device 1 according to Embodiment 1 will be described hereafter. Light generated in the multiple light emitting parts 2 are collected by the corresponding first lenses 3 and enter the incidence end openings of the corresponding optical waveguides 40 of the optical multiplexer 4. The light entering the incidence end openings of the corresponding optical waveguides 40 of the optical multiplexer 4 are multiplexed by the optical multiplexer 4 and exit to the second lens 9 via the optical waveguide 42. The second lens 9 collects the light and outputs it outside the light emitting device 1. Here, in FIGS. 1 to 3A, the part retrieving light output from the package 16 is omitted.

As described earlier, the assembled light emitting device 1 is subject to variation in height among the luminous points of the light emitting parts 2 and among the light incidence parts of the optical waveguides 40 due to various errors; therefore, usually, there is difference in height (height difference) between the luminous points of the light emitting parts and the incidence parts of the optical waveguides 40.

When the light emitting parts 2 comprises an optical semiconductor device, the luminous points of the light emitting parts 2 are subject to variations in height of, for example, up to ±0.065 mm with respect to the optimum height due to manufacturing variation of the light emitting parts 2, and manufacturing tolerance of the light emitting part substrate 6, light emitting part carrier 7, and lens carrier 10. On the other hand, the optical waveguides 40 are subject to variations in height of, for example, up to ±0.058 mm with respect to the optimum height due to manufacturing tolerance of the optical waveguides 40 and lens carrier 10. Then, in such a case, the optical waveguides 40 may have height difference of up to −0.123 mm with respect to the luminous points of the light emitting parts 2. Even with the three-dimensional positional adjustment of the first lens 3 disclosed in the Patent Literature 1, the coupling efficiency cannot sufficiently be improved where there is such height difference.

Figure 4:
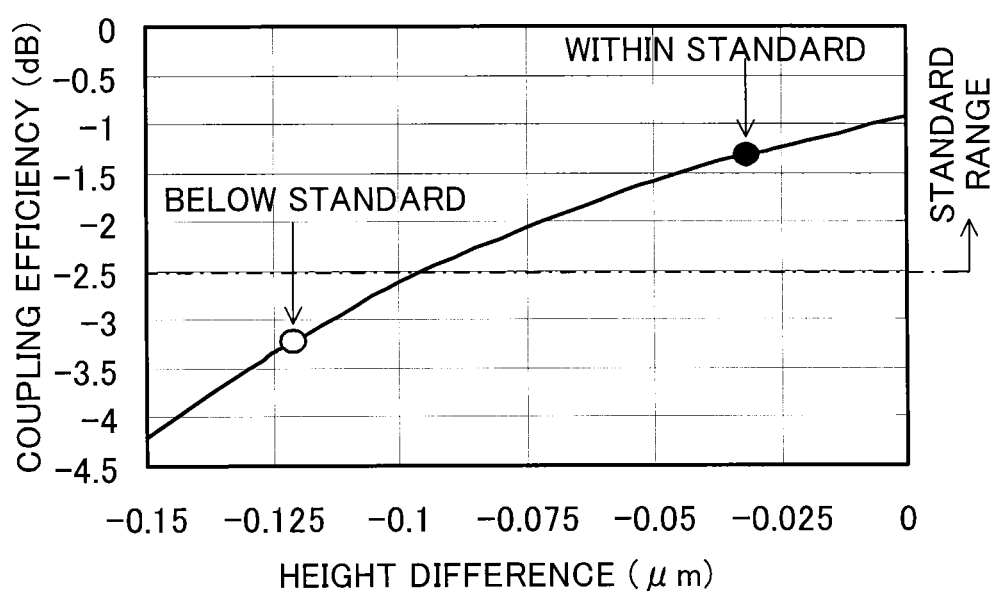
FIG. 4 is a graphical representation showing exemplary improved coupling efficiency of the light emitting device according to Embodiment 1.

The open circle in FIG. 4 shows the coupling efficiency in the above case. FIG. 4 is a graphical representation showing exemplary improved coupling efficiency of the light emitting device according to Embodiment 1. The prior art coupling efficiency is indicated by the open circle for comparison. The height difference is plotted as an abscissa. The height difference in the above case is −0.123 mm and then the coupling efficiency is −3.3 dB. If the target coupling efficiency is, for example, 0 to −2.5 dB, this coupling efficiency does not fulfill the target coupling efficiency. Then, the light emitting device 1 cannot be applied to products for applications requiring the coupling efficiency of 0 to −2.5 dB.

In the light emitting device 1 according to Embodiment 1, as shown in the part C enclosed by the dash-dot line in FIG. 3A and the enlarged view of the part C in FIG. 3B, the surface of the light emitting part carrier 7 that is in contact with the lens carrier 10 is tilted toward the height direction at an elevation angle θ on the basis of the direction (the direction X) perpendicular to the longitudinal direction (the direction Y) of the optical waveguides 40 on the surface (an X-Y plane) on which the optical waveguides 40 are formed. The surface of the lens carrier 10 facing and in contact with this tilted surface is also tilted at the same angle. The drive part 5 moves the light emitting part carrier 7 along the tilted surface of the lens carrier 10 via the drive shaft 50 (in the arrowed direction in FIGS. 3A and 3B). The light emitting part 2 is mounted on the light emitting part carrier 7 via the light emitting part substrate 6. Therefore, as the light emitting part carrier 7 moves along the tilted surface of the lens carrier 10, namely in the arrowed direction in FIGS. 3A and 3B, the height of the light emitting part 2 changes. Here, since the light emitting part 2 is placed in parallel to the surface on which the optical waveguides 40 are formed, namely an X-Y plane, the parallel state is maintained while the height is adjusted. In other words, the central axis (optical axis) of light from the light emitting part 2 remains parallel to the surface on which the optical waveguides 40 are formed.

In the above case in which the height difference is −0.123 mm, for example, provided that the angle θ is 13°, the height of the luminous point of the light emitting part 2 is lowered by 0.09 mm after the light emitting part carrier 7 moves in the direction X by 0.3 mm. Then, the height difference between the luminous point of the light emitting part 2 and the optical waveguide 40 can be reduced to −0.033 mm from −0.123 mm in the prior art. The coupling efficiency corresponding to this height difference is −1.4 dB as indicated by a filled circle in FIG. 4, fulfilling the target coupling efficiency of 0 to −2.5 dB.

Furthermore, when the angle θ is 5°, the height of the luminous point of the light emitting part 2 is lowered by 0.03 mm after the light emitting part carrier 7 moves in the direction X by 0.3 mm. Then, the height difference between the luminous point of the light emitting part 2 and the optical waveguide 40 can be reduced to −0.093 mm from −0.123 mm in the prior art. The coupling efficiency corresponding to this height difference is −2.4 dB as indicated by a filled circle in FIG. 4, fulfilling the target coupling efficiency of 0 to −2.5 dB.

Here, the accuracy of height adjustment is improved as the angle θ is smaller. However, the moving distance in the direction X is increased for the same height adjustment. Since the optical waveguide 40 is greater in width in the direction X than in the height direction (the direction Z), displacement in the direction X is more tolerated than displacement in the height direction in regard to deterioration in the coupling efficiency. However, even displacement in the direction X should be within a given range because the coupling coefficient may deteriorate where such displacement becomes fairly great. The above value 0.3 mm is given as an example of this given range.

Figure 5A:
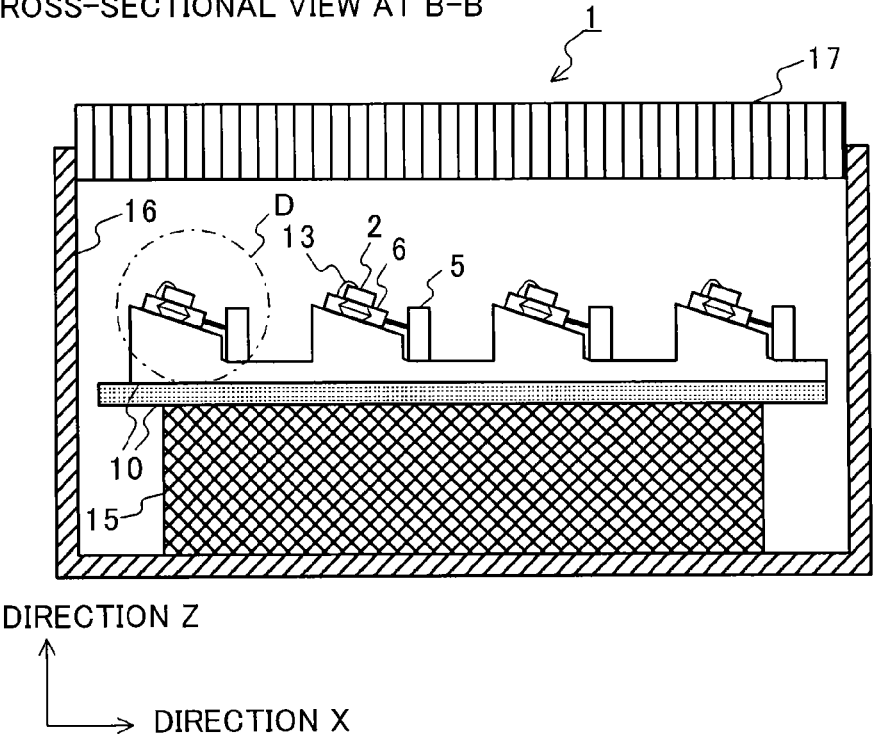
FIG. 5A is a cross-sectional view at B-B' of the light emitting device according to a modified embodiment of Embodiment 1.
Figure 5B:
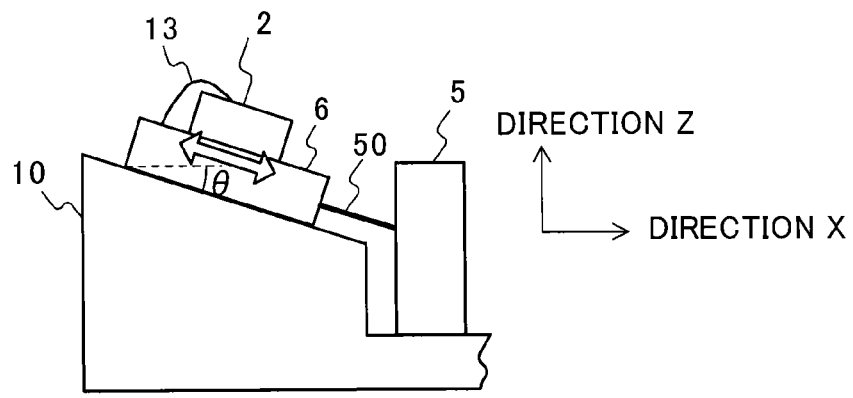
FIG. 5B is an enlarged view of the part D in FIG. 5A.

Both FIGS. 5A and 5B show an exemplary configuration of the light emitting device according to a modified embodiment of Embodiment 1. FIG. 5A shows a cross-sectional view at B-B' in FIG. 1 and FIG. 5B shows an enlarged view of the part D enclosed by a dash-dot line in FIG. 5A.

In this modified embodiment, the light emitting part carrier 7 is eliminated and the drive part 5 directly drives the light emitting part substrate 6. Therefore, the light emitting part 2 moves in a tilted state along the tilted surface of the lens carrier 10, whereby the height of the luminous point thereof is adjusted. In this modified embodiment, the light emitting part 2 is not parallel to, but is tilted with respect to the surface on which the optical waveguides 40 are formed, namely an X-Y plane. However, the optical axis of the light emitting part 2 is parallel to the surface on which the optical waveguides 40 are formed. This parallel state is maintained while the height is adjusted.

The light emitting device 1 according to Embodiment 1 including the modified embodiment can adjust the heights of the light emitting parts 2 with respect to the corresponding optical waveguides 40 of the optical multiplexer 4 individually and easily with high accuracy. Such adjustment enables improvement in the coupling efficiency. The optical axis of the light emitting part 2 remains parallel to the surface on which the optical waveguides 40 are formed while the height is adjusted. Therefore, height adjustment of the light emitting part 2 results in height adjustment of the optical axis, facilitating height difference adjustment.

The above modified embodiment can yield the same effect as described above even if the light emitting part carrier 7 is kept in the form of a flat plate and the light emitting part substrate 6 is placed on the flat plate. In the case of providing a flat plate, the light emitting part carrier 7 in the form of a flat plate can be driven instead of directly driving the light emitting part substrate 6. Risk of the light emitting part substrate 6 being damaged in association with connection to the drive shaft 50 can be reduced compared with the modified embodiment. Then, the reliability of the light emitting device 1 is ensured.

The light emitting device 1 can contain other components in the package 16 depending on applications. Furthermore, the light emitting device 1 does not need to comprise all components shown in FIGS. 1 to 3B, 5A and 5B; some of the components can be combined.

Embodiment 2

Figure 6A:
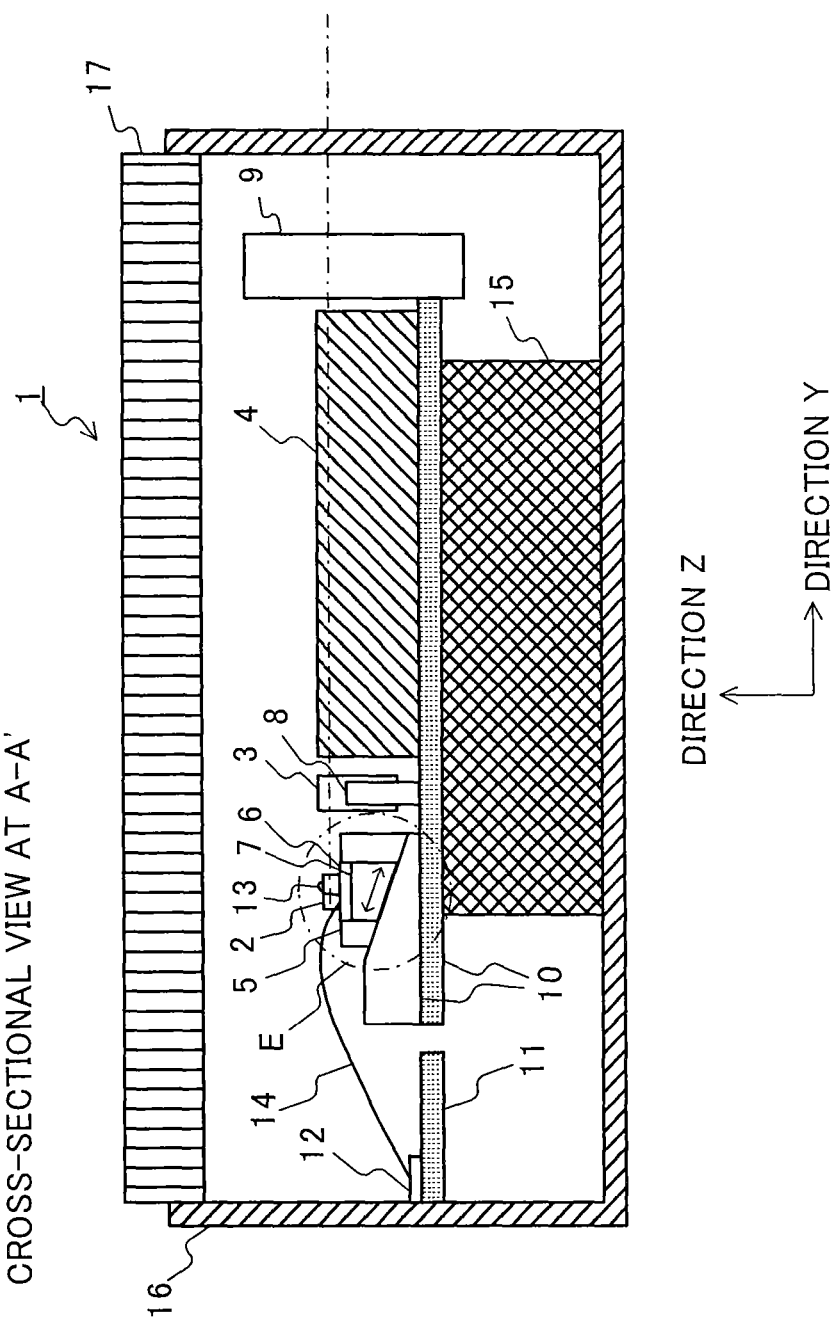
FIG. 6A is a cross-sectional view at A-A' of the light emitting device according to Embodiment 2 of the present invention.
Figure 6B:
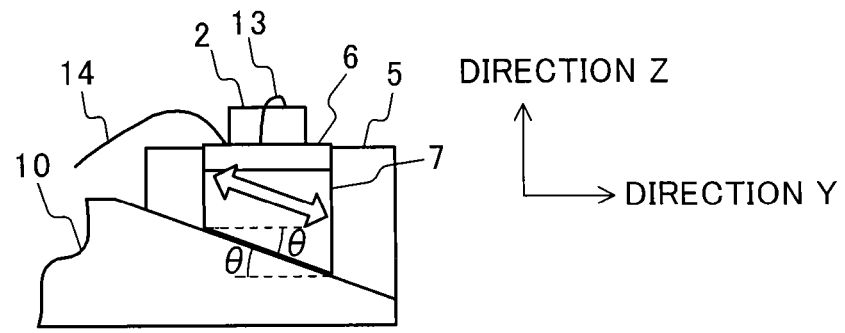
FIG. 6B is an enlarged view of the part E in FIG. 6A.
Figure 7:
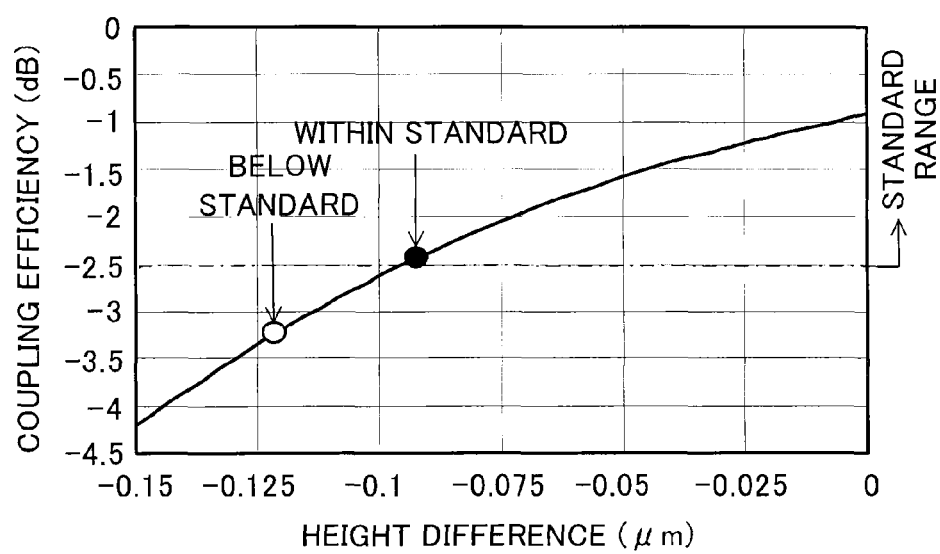
FIG. 7 is a graphical representation showing exemplary improved coupling efficiency of the light emitting device according to Embodiment 2.

The light emitting device 1 according to Embodiment 2 has basically the same configuration in a top view as in FIG. 1. Both FIGS. 6A and 6B show the difference from Embodiment 1. FIG. 6A shows a cross-sectional view at A-A' in FIG. 1 and FIG. 6B shows an enlarged view of the part E enclosed by a dash-dot line in FIG. 6A.

The difference from Embodiment 1 is as follows. The surface of the light emitting part carrier 7 that is in contact with the lens carrier 10 is tilted toward the height direction at an elevation angle θ on the basis of the direction opposite to the longitudinal direction (the direction Y) of the optical waveguides 40 with respect to the surface (the X-Y plane) on which the optical waveguides 40 are formed. The surface of the lens carrier 10 facing and in contact with that tilted surface is also tilted at the same angle θ. The drive part 5 drives the light emitting part carrier 7 via the drive shaft 50 along the tilted surface of the lens carrier 10 in the arrowed direction in FIGS. 6A an 6B. Since the light emitting part 2 is mounted on the light emitting part carrier 7 via the light emitting part substrate 6, the height of the light emitting part 2 changes as the light emitting part carrier 7 moves along the tilted surface of the lens carrier 10. Here, the central axis of light from the light emitting part 2 remains parallel to the surface on which the optical waveguides 40 are formed while the height is adjusted.

In the embodiment of FIGS. 6A and 6B, the position of the luminous point of the light emitting part 2 shifts in the longitudinal direction (the direction Y) of the optical waveguides 40 as the height is adjusted. Therefore, if the first lens 3 is fixed, the position of the focusing point in the direction Y changes and the focusing spot size at the light incidence part of the optical waveguide 40 changes. When the focusing spot size is enlarged, in other words when defocusing occurs, the light incidence rate to the optical waveguide 40 drops and so does the coupling efficiency. However, this is less influential than height change. Therefore, this will not substantially be an issue as long as the tilt angle θ is not excessively small. Furthermore, the positional change of the focusing point can be diminished by adjusting the position of the first lens 3 in the direction Y.

The light emitting device 1 according to Embodiment 2 can adjust the heights of the light emitting parts 2 with respect to the corresponding optical waveguides 40 of the optical multiplexer 4 individually and easily with high accuracy. Then, the height difference between a light emitting part 2 and the corresponding optical waveguide 40 can be adjusted individually and easily with high accuracy, enabling improvement in the coupling efficiency. The optical axis of the light emitting part 2 remains parallel to the surface on which the optical waveguides 40 are formed while the height is adjusted. Therefore, height adjustment of the light emitting part 2 results in height adjustment of the optical axis, facilitating height difference adjustment.

According to the light emitting device 1 according to Embodiment 2, height adjustment results in changing the distance between the luminous point and the light incidence part of the optical waveguide 40. Then, the focusing spot size at the light incidence part of the optical waveguide 40 changes. However, this does not cause the coupling efficiency to deteriorate as much as the height difference does. Furthermore, the focusing spot size can be reduced by adjusting the position of the first lens 3. In such a case, deterioration in the coupling efficiency can further be reduced.

The light emitting device 1 can be used in optical modules that are electronic parts for converting electric signals and optical signals with each other.

Having described and illustrated the principles of this application by reference to one (or more) preferred embodiment(s), it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

LEGEND

1 Light emitting device
2 Light emitting part
3 First lens
4 Optical multiplexer
5 Drive part
6 Light emitting part substrate
7 Light emitting part carrier
8 Lens holder
9 Second lens
10 Lens carrier
11 Feed-through
12 Pattern
13 Light emitting part wire
14 Signal wire
15 Package carrier
16 Package
17 Package cover
40 Optical waveguide
41 Optical multiplexing part
42 Optical waveguide
50 Drive shaft

What is claimed is:
1. A light emitting device, comprising:
multiple light emitters;

an optical multiplexer comprising openings of multiple optical waveguides at the incidence end for light from the multiple light emitters and an opening of an optical waveguide combining said multiple optical waveguides at the light exit end; and multiple drivers driving said multiple light emitters, respectively, along a tilt direction of a surface tilted at a given angle with respect to the surface on which said optical waveguides are formed, wherein said light emitters are provided at an angle that makes the central axes of light from said light emitters in the light emission direction parallel to the surface on which said optical waveguides are formed.

2. The light emitting device according to claim 1, wherein: said tilted surface is a surface tilted toward the height direction at a given elevation angle on the basis of the direction opposite to the longitudinal direction of said optical waveguides.

3. The light emitting device according to claim 1, wherein: said tilted surface is a surface tilted toward the height direction at a given elevation angle on the basis of the direction perpendicular to the longitudinal direction of said optical waveguides on the surface parallel to the surface on which said optical waveguides are formed.

4. The light emitting device according to claim 2, wherein: said light emitters are provided in parallel to the surface on which said optical waveguides are formed.

5. The light emitting device according to claim 3, wherein: said light emitters are provided in parallel to the surface on which said optical waveguides are formed.

6. The light emitting device according to claim 3, wherein: said light emitters are provided in parallel to the said tilted surface.

* * * * *